United States Patent [19]

Harrison

[11] Patent Number: 4,794,373

[45] Date of Patent: * Dec. 27, 1988

[54] LIGHTING STRIP APPARATUS FOR VISUALLY GUIDING THE OCCUPANTS OF A STRUCTURE

[75] Inventor: John M. Harrison, Chattanooga, Tenn.

[73] Assignee: Collins & Aikman Corporation, New York, N.Y.

[*] Notice: The portion of the term of this patent subsequent to Apr. 12, 2005 has been disclaimed.

[21] Appl. No.: 900,826

[22] Filed: Aug. 27, 1986

[51] Int. Cl.⁴ .............................. G08B 25/00
[52] U.S. Cl. .................... 340/286 R; 340/114 R; 340/815.21; 340/332; 362/153
[58] Field of Search ............ 340/815.21, 286 R, 332, 340/114 R, 945, 963, 815.15, 331, 286 M, 321; 362/153, 62, 227, 249, 226; 244/118.5, 1 R; 40/570; 182/18

[56] References Cited

U.S. PATENT DOCUMENTS

| | | | |
|---|---|---|---|
| 3,527,933 | 9/1970 | Thümmel | 362/226 |
| 3,551,723 | 12/1970 | Van Groningen | 362/227 |
| 3,894,225 | 7/1975 | Chao | 362/249 |
| 4,029,994 | 6/1977 | Iwans | 340/945 |
| 4,173,035 | 10/1979 | Hoyt | 362/249 |
| 4,263,640 | 4/1981 | Altman | 362/227 |
| 4,303,969 | 12/1981 | Hamilton et al. | 362/153 |
| 4,340,929 | 7/1982 | Konikoff et al. | |
| 4,347,499 | 8/1982 | Burkman, Sr. et al. | |
| 4,376,966 | 3/1983 | Tieszen | 362/311 |
| 4,401,050 | 8/1983 | Britt et al. | |
| 4,485,297 | 11/1984 | Grise et al. | |
| 4,521,839 | 6/1985 | Cook et al. | 362/227 |
| 4,737,764 | 4/1988 | Harrison | 340/114 R |

OTHER PUBLICATIONS

Safe Lite Brochure, Collins & Aikman, Floor Coverings Division, Dalton, Ga.

Primary Examiner—Donnie L. Crosland
Assistant Examiner—Brent A. Swarthout
Attorney, Agent, or Firm—Bell, Seltzer, Park & Gibson

[57] ABSTRACT

An apparatus for visually guiding the occupants of a structure in a path of travel along the floor within a structure is provided. This apparatus is comprised of a carpet overlying the floor, and a lighting strip positioned underneath the carpet. The lighting strip comprises an elongate ribbon, with a group of laterally spaced-apart electrical conductors encased in and extending longitudinally of the ribbon of sheet material. A series of light-transmissive plastic housings are connected to and arranged longitudinally along a common outer surface of the ribbon of plastic sheet material. Light-emitting means are positioned within each of the housings, and are electrically connected to predetermined ones of the group of electrical conductors encased in the ribbon of sheet material. The carpet has holes extending therethrough which are arranged in a series corresponding to the series of light-transmissive housings on the lighting strip. The housings are positioned in the holes of the carpet so that when the light-emitting means positioned within the housings are energized, a visually discernible pathway appears along the face of the carpet.

20 Claims, 2 Drawing Sheets

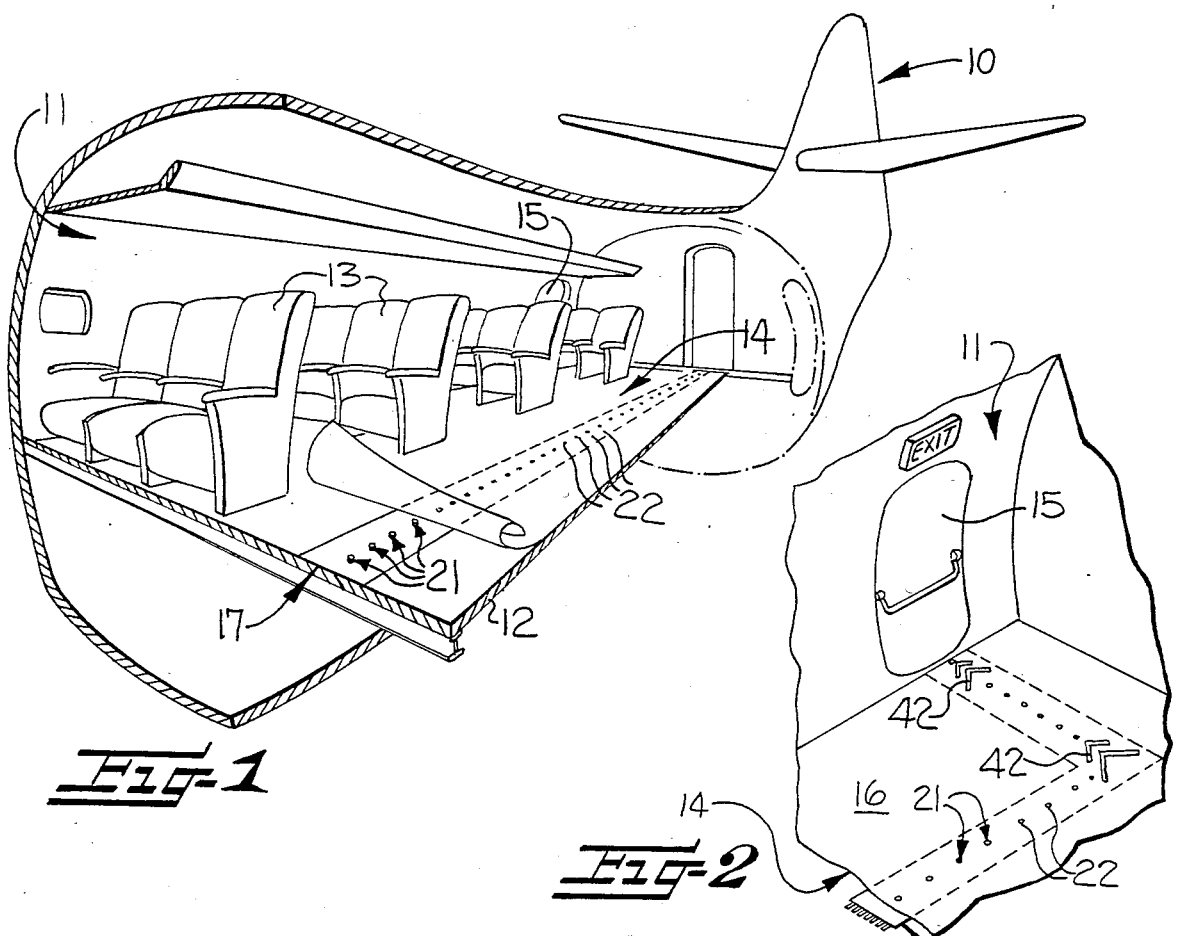
Fig-1
Fig-2
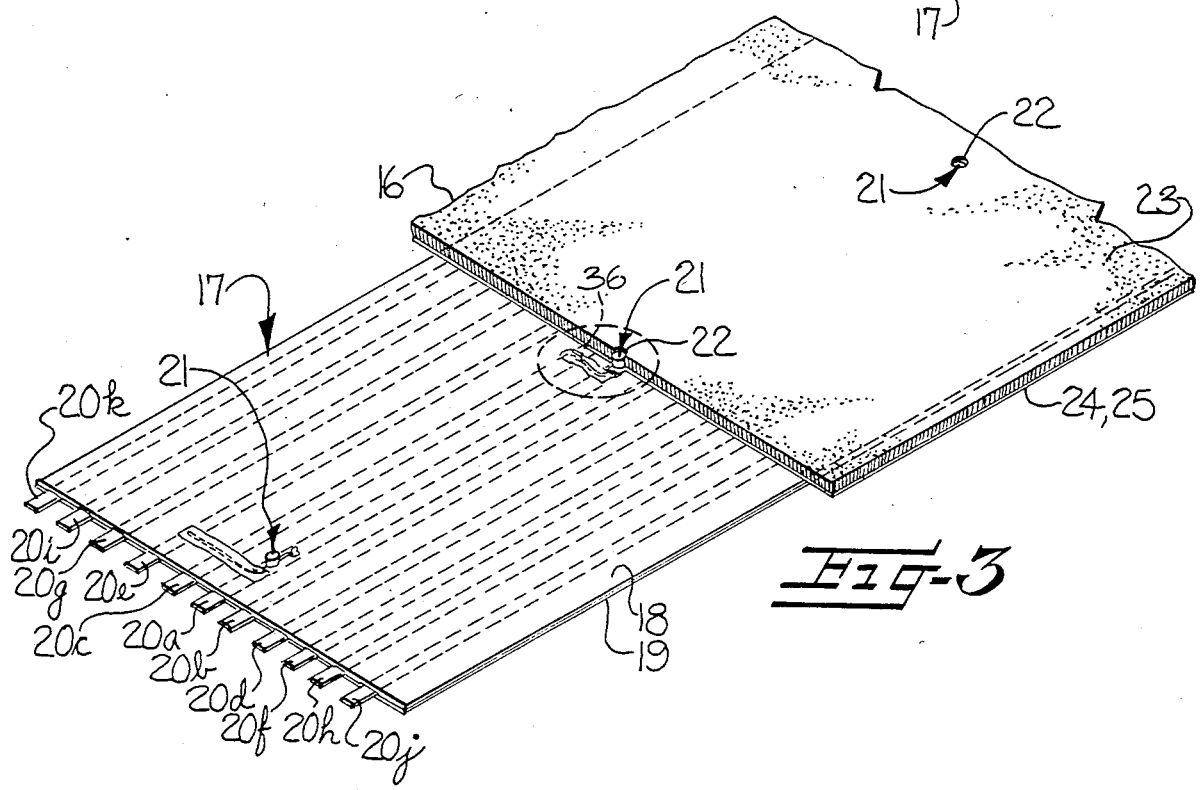
Fig-3

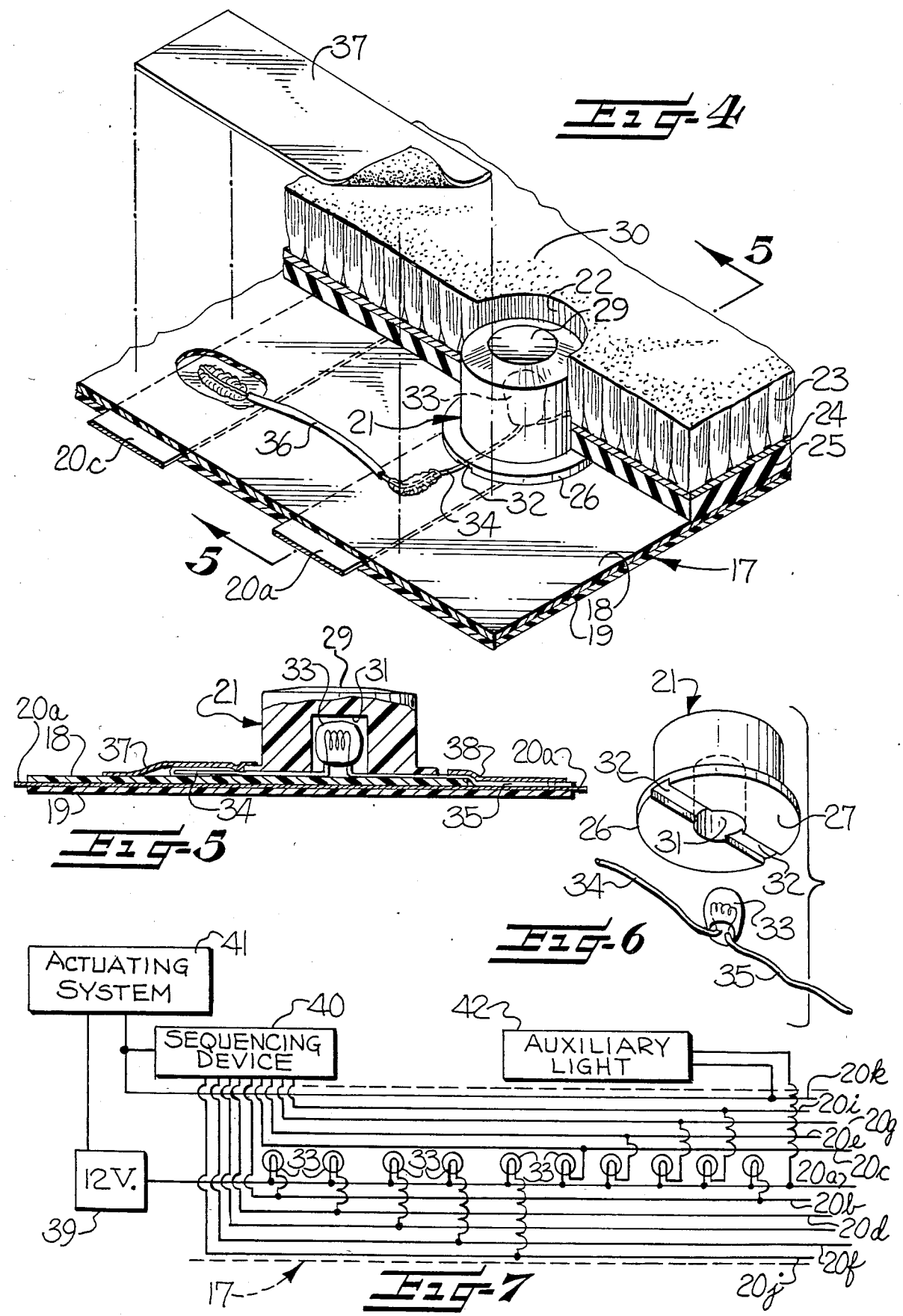

4,794,373

LIGHTING STRIP APPARATUS FOR VISUALLY GUIDING THE OCCUPANTS OF A STRUCTURE

This application is related to application Ser. No. 869,001 filed May 30, 1986, now U.S. Pat. No. 4,737,764, granted Apr. 12, 1988, and entitled Modular Floor Covering Units with Built-In Lighting.

NATURE OF THE INVENTION

This invention relates to guide apparatus generally, and particularly relates to an apparatus which provides visual pattern of lights along a covered surface.

BACKGROUND OF THE INVENTION

It is often necessary to have a way to direct people into, out of, or from place to place within a structure. Such guide systems include emergency signals for rapidly directing the occupants of the structure to an exit in the event of an emergency, as well as day-to-day guidance systems for efficiently directing pedestrian traffic within the structure. Structures in which such systems may be used include stationary structures having heavy pedestrian traffic, such as hospitals and modern office or hotel buildings, as well as transportation structures such as ships, trains, buses, and aircraft. Suitable locations for such guide systems in these types of structures include both the floor and the wall of the structure.

In the case of aircraft cabin emergency lighting signals, floors have been recognized, as in U.S. Pat. No. 4,347,499 to Burkman, as a location which may be less obscured by smoke than locations on the walls or ceilings of the structure. Such "floor-proximity" emergency lighting is so desirable that its use has been mandated by the FAA. See D. Massey, "FAA's Floor Lighting Rule Opens Market to Suppliers," *Commuter Air*, page 46 (June, 1986).

Accordingly, an object of the present invention is to provide a lighting system adapted for mounting beneath a floor or wall covering to provide an electrically energized, illuminable, visually discernible indicator thereon.

Another object of the present invention is to provide a floor lighting system for a structure adapted to serve as a guide for the occupants of the structure.

A more particular object of the invention is to provide a lighting system which is suitable for positioning beneath a carpet.

SUMMARY OF THE INVENTION

The above and other objects and advantages of the present invention are achieved in the embodiments illustrated herein by a lighting strip for use in providing a visual pattern of lights along a covered surface such as a carpeted floor. The lighting strip comprises an elongate flexible ribbon of plastic sheet material, with a group of laterally spaced-apart electrical conductors encased in and extending longitudinally of the ribbon of sheet material. A series of light-transmissive plastic housings are connected to and arranged longitudinally along a common outer surface of the ribbon of plastic sheet material. Light-emitting means are positioned within each of the housings, and are electrically connected to predetermined ones of the group of electrical conductors encased in the ribbon of sheet material.

Also provided herein is an apparatus for visually guiding the occupants of a structure in a path of travel along a floor within the structure. This apparatus is comprised of a carpet overlying the floor, and a lighting strip as described above extending underneath the carpet. The carpet has holes extending therethrough which are arranged in a series corresponding to the series of light-transmissive housings on the lighting strip. The housings are positioned in the holes of the carpet so that when the light-emitting means positioned within the housings are energized, a visually discernible pathway appears along the face of the carpet. The foregoing apparatus can be used in combination with a power means electrically connected to the group of conductors, in a structure having a passageway therein and an emergency exit located nearby the passageway, to provide a visually discernible pathway in the floor of the passageway which can be followed by the occupants of the structure to the emergency exit.

The material forming the elongate flexible ribbon of plastic sheet material in the lighting strip is preferably a relatively stiff material. This stiffness imparts flexural rigidity to the ribbon, both lengthwise and widthwise thereof, to provide a memory to urge the ribbon to lie linearly in a straight condition along a floor surface. This feature greatly simplifies alignment and installation of the lighting strip. Moreover, while this material is preferably relatively stiff, its provision in thin sheet form in the lighting strip imparts sufficient flexibility thereto to allow the lighting strip to be provided in roll form, for convenient shipping and handling.

BRIEF DESCRIPTION OF THE DRAWINGS

The foregoing and other objects, features, and advantages of the invention will be apparent from the following description of the preferred embodiments and the drawings, in which:

FIG. 1 is a cutaway view of an aircraft cabin embodying the present invention.

FIG. 2 is a detailed view of a portion of the aircraft cabin of FIG. 1.

FIG. 3 is a perspective view of a lighting strip of the present invention mounted beneath a carpet, with a portion of the carpet, cut away.

FIG. 4 is an enlarged and partially exploded view of that portion of FIG. 3 indicated by the circle 4.

FIG. 5 is a sectional view of a lighting strip of the present invention taken along the line 5—5 of FIG. 4.

FIG. 6 is an exploded view of the light-transmissive housing and lighting means used in the present invention.

FIG. 7 is a schematic diagram of a guide apparatus of the present invention.

DETAILED DESCRIPTION OF THE PREFERRED EMBODIMENTS

FIG. 1 illustrates a passenger aircraft 10 which embodies the present invention. The aircraft has a passenger comparteent 11 with a floor (or deck) 12, a plurality of passenger seats 13 positioned on the floor, and a passageway 14 oriented down the center of the passenger compartment. An emergency exit 15 is located nearby the passageway, as illustrated in FIG. 2. FIG. 1 shows that a carpet 16 overlies the floor of the passageway, and a lighting strip 17 extends underneath the carpet.

The lighting strip 17, illustrated more fully in FIG. 3, is comprised of an elongate flexible ribbon of plastic sheet material. This elongate ribbon is formed of upper and lower plastic sheets (18,19) which are laminated together. One suitable material for these plastic sheets is an aromatic polyimide material such as "CAPTON" (manufactured by Du Pont). Another suitable material, when fire retardancy is a lesser concern, is a polyethylene terephthalate material such as "MYLAR" (also manufactured by Du Pont). A group of laterally spaced-apart tape-like metallic ribbons 20 made of copper are encased in the ribbon of sheet material by laminating them between the upper and lower sheets. The copper ribbons are coated with tin to enhance their corrosion resistance. The electrical conductors extend longitudinally of the ribbon of sheet material.

A series of light-transmissive plastic housings 21 are positioned along the top surface of the ribbon of sheet material (see also FIG. 1). The housings are cemented to the ribbon with a suitable adhesive, such as a cyanoacrylate adhesive. A suitable material for the light-transmissive housings is a polycarbonate, such as Du Pont's "LEXAN." The housings may be clear or tinted. The housings are shown in longitudinal alignment and preferably overlie a common one of the tape-like metallic conductors, and are preferably spaced apart a small distance such as six inches. The carpet which overlies the lighting strip has holes 22 extending therethrough, which holes are arranged in a series corresponding to the arrangement of the series of light-transmissive housings connected to the ribbon of sheet material. The diameter of the holes in the carpet is the same as or slightly smaller thn the outer diameter of the housings to obtain a snug fit.

FIGS. 4 and 5 provide a more detailed view of the light-transmissive housing 21, positioned in a hole 22 extending through the carpet, with a portion of the carpet removed. The carpet is formed of cut pile fabric 23, has a primary backing 24 interconnecting the cut pile fabric, and has a secondary backing 25 which serves as a cushioning layer adhered to and underlying the primary backing.

The plastic housing 21 has a flange 26 extending laterally outwardly from lower regions thereof (see also FIG. 6). This flange serves to provide an enlarged base 27 which facilitates cementing the housing to the ribbon of plastic sheet material, and also serves to anchor the housing so that it cannot be pulled upward through the hole in the carpet. The housing has a crowned or bevelled top 29 to minimize the chance that the heels of shoes will catch thereon. When positioned beneath the carpet, the top 29 of the housing is slightly recessed from the surface 30 of the carpet, so that, when an average load compresses the carpet, the carpet surface and the top surface of the housing are substantially flush.

The housing has a cavity 31 formed therein which opens onto the bottom surface of the housing (see FIG. 6). Channels 32 are formed in the bottom surface of the housing, and extend from the cavity to the outer edge of the flange. A small incandescent bulb 33 (referred to as a "grain of wheat" bulb) is positioned within the cavity of the light-transmissive housing. The bulb has two lead conductors 34,35, one extending through each of the channels in the base of the housing when the housing is mounted on the ribbon (see FIG. 5). One of the lead conductors (35), is soldered to the tape-like conductor (20a) underlying the housing (see FIG. 5); the other lead (34) is electrically connected to a predetermined one (20c in FIG. 4) of the remaining tape-like conductors. This electrical connection is accomplished by soldering a small piece of insulated wire 36 between the lead conductor and the tape-like conductor (see FIG. 4). All electrical connections, of course, penetrate through the top layer of sheet material. The lead conductor 34 and the insulated wire 36 are secured to the ribbon of plastic sheet material with a strip of insulating tape 37. The other lead conductor 35 is also covered with a piece of insulating tape 38. Those skilled in the art will appreciate that these electrical connections can be made in numerous ways: for example, insulated wire 36 could be replaced with a printed conductor formed from electrically conductive ink.

FIG. 7 presents a schematic wiring diagram of an apparatus of the present invention, showing a number of incandescent lights 33. This figure shows that one of the lead conductors of each pair of lead conductors emanating from each incandescent light is connected to a common one (20a) of the tape-like electrical conductors. The light-transmissive housings overlie this common tape-like electrical conductor. Other lead conductors of each pair are electrically connected to a tape-like conductor immediately adjacent the common one of the tape-like conductors. Further ones on the pairs of lead conductors are electrically connected to a tape-like conductor more remote from the common one of tape-like conductors. With this arrangement, the light-emitting means may be sequentially actuated so as to impart a visual direction signal to a viewer. Nine consecutive bulbs are so connected to different ones (20b through 20j) of the tape-like metallic conductors in a predetermined pattern. This pattern continually repeats itself along the entire length of the lighting strip. The lighting strip is provided in lengths of up to 300 feet.

Such an apparatus includes a low voltage power supply 39, such as a 6-volt A.C. power supply from a transformer, with a 6-volt D.C. battery back-up. The battery back-up is preferably maintained with a trickle charger. Alternately, as a further safeguard, the light-emitting means may be energized solely by direct current from a trickle-charged battery. If the light-emitting means are to be sequentially activated, a sequencing device 40 is interposed between the power supply and various ones of the tape-like metallic conductors, as shown. Finally, an actuating system 41 may be provided, as illustrated in FIG. 7, to appropriately activate the system. Such devices are known in the art.

FIG. 7 also shows that, in addition to the common metallic conductor 20a, and in addition to the sequentially activated metallic conductors 20b through 20j, a metallic conductor 20k which is continuously energized while the system is activated is also provided. This conductor 20k, along with the common conductor 20a, is electrically connected to the lead conductors of auxiliary lights 42 which are part of the overall floor lighting system, but which are continuously illuminated and not sequentially activated. The number of metallic conductors incorporated into the lighting strip can be varied as desired for different applications. The floor mounted lights in the shape of arrowheads shown in FIG. 2 are exemplary of such continuously energized auxiliary lights. These auxiliary lights may be constructed in the same manner as the lighting units disclosed in my co-pending U.S. patent application Ser. No. 869,001, now U.S. Pat. No. 4,737,764, the disclosure of which is incorporated herein by reference, or may be constructed in the same basic manner as the light-transmissive housings disclosed herein, with a plurality of incandescent lights positioned in a cavity formed therein.

The lighting strip of the present invention can be retrofit under existing carpet by punching holes in the carpet, at the installation site, with a small die. New carpet can be manufactured with the holes prepunched on a standard press. The carpet used with the present invention can be in any form, including both carpet tiles and roll goods.

In the drawings and specification, there has been discoosed typical preferred embodiments of the invention. Although specific terms are employed, they are used in a generic and descriptive sense only and not for purposes of limitation, the scope of the invention being set forth in the following claims.

That which is claimed is:

1. An apparatus for visually guiding the occupants of a structure in a path of travel along a floor within the structure, comprising a carpet having a fibrous face and overlying the floor, a lighting strip extending underneath said carpet and comprising an elongate ribbon of flexible plastic sheet material, a group of laterally spaced-apart electrical conductors encased in and extending longitudinally of said ribbon of sheet material, a series of relatively small light-transmissive plastic housings connected to and arranged longitudinally in spaced relationship along a common outer surface of said ribbon of plastic sheet material, and a relatively small and singular light-emitting means within each of said housings and being electrically connected to predetermined ones of said group of electrical conductors, said carpet having relatively small holes extending therethrough and spaced inwardly from the sides of the carpet and arranged in a series corresponding to said series of light-transmissive housings, and said housings being positioned in the holes of said carpet and being completely surrounded by said fibrous face so that when the light-emitting means positioned within the housings are energized a visually discernible pathway is defined along the fibrous face of the carpet, and when the light-emitting means are not energized no pathway of lights is discernible and the light-emitting means are substantially hidden from view.

2. An apparatus according to claim 1 wherein said sheet material forming said ribbon of plastic is relatively stiff so as to impart such flexural rigidity to the ribbon both lengthwise and widthwise thereof as to provide a memory to urge the ribbon to lie linearly in a straight condition along a floor surface.

3. An apparatus according to claim 1 wherein said plastic housings have flanges extending laterally outwardly from lower regions thereof to provide enlarged bases on the housings, upper surfaces of said flanges engaging the backside of said carpet around the holes to aid in uprightly positioning the housings in the carpet.

4. An apparatus according to claim 1 wherein said electrical conductors are tape-like and are formed of metal, and said series of plastic housings overlie said tape-like metal conductors for enhancing the stability of the housings.

5. An apparatus according to claim 4, further comprising at least one auxiliary light-transmissive plastic housing separate from said longitudinally arranged series of light-transmissive plastic housings, said auxiliary light-transmissive plastic housing having an auxiliary light-emitting means positioned therein and means electrically connecting said auxiliary light-emitting means to a predetermined pair of tape-like metallic conductors in said group of tape-like metallic electrical conductors.

6. An apparatus acoording to claim 4 wherein at least certain ones of said plastic housings are arranged in longitudinal alignment and overlie a common one of said tape-like electrical conductors, and wherein the light-emitting means within each of said aligned housings has a pair of conductors extending therefrom with one of the conductor of each pair being electrically connected to said common one of said tape-like electrical conductors and the other conductors of said pairs of conductors being electrically connected to selected ones of the remaining tape-like electrical conductors in said group.

7. An apparatus according to claim 4 wherein at least certain ones of said plastic housings are arranged in longitudinal alignment and overlie a common one of said tape-like electrical conductors, and wherein the light-emitting means within each of said aligned housings has a pair of conductors extending therefrom with one of the conductors of each pair being electrically connected to said common one of said tape-like electrical conductors, other conductors of each pair being electrically connected to a tape-like conductor immediately adjacent said common one of said tape-like electrical conductors, and further ones of said pairs of conductors being electrically connected to a tape-like conductor more remote from said common one of tape-like conductors so that the light-emitting means may be sequentially actuated so as to impart a visual direction thereto.

8. An apparatus for visually guiding the occupants of a structure in a path of travel along a floor within the structure, comprising a carpet having a fibrous face and overlying the floor, a lighting strip extending underneath said carpet and comprising an elongate flexible ribbon formed of relatively stiff plastic sheet material, the stiffness of the plastic sheet material forming said ribbon imparting such flexural rigidity to the ribbon both lengthwise and width-wise thereof as to provide a memory to urge the ribbon to lie linearly in a straight condition along the floor, a group of laterally spaced-apart tape-like metallic electrical conductors encased in and extending longitudinally of said ribbon of sheet material, a series of relatively small light-transmissive plastic housings connected to and arranged longitudinally in spaced relationship along a common outer surface of said ribbon of plastic sheet material, and a relatively small and singular light-emitting means within each of said housings and being electrically connected to predetermined ones of said group of tape-like metallic electrical conductors, said carpet having relatively small holes extending therethrough and spaced inwardly from the sides of the carpet and arranged in a series corresponding to said series of light-transmissive housings, and said housings being positioned in the holes of said carpet and being completely surrounded by said fibrous face so that when the light-emitting means positioned within the housings are energized a visually discernible pathway is defined along the fibrous face of the carpet, and when the light-emitting means are not energized no pathway of lights is discernible and the light-emititng means are substantially hidden from view.

9. An apparatus as claimed in claim 8, further comprising at least one auxiliary light-transmissive plastic housing separate from said longitudinally arranged series of light-transmissive plastic housings, said auxiliary light-transmissive plastic housing having an auxiliary light-emitting means positioned therein and means electrically connecting said auxiliary light-emitting means to a predetermined pair of tape-like metallic conductors in said group of tape-like metallic electrical conductors.

10. In combination with a structure having a passageway therein, and wherein an emergency exit is located nearby the passageway, an apparatus for guiding the occupants of the structure along said passageway to said exit, comprising a carpet having a fibrous face and overlying the floor of said passageway, a lighting strip extending underneath said carpet and comprising an elongate ribbon of flexible plastic sheet material, a group of laterally spaced-apart electrical conductors encased in and extending longitudinally of said ribbon of sheet material, a series of relatively small light-transmissive plastic housings connected to and arranged longitudinally in spaced relationship along a common outer surface of said ribbon of plastic sheet material, and a relatively small and singular light-emitting means within each of said housings and being electrically connected to predetermined ones of said group of electrical conductors, said carpet having relatively small holes extending therethrough and spaced inwardly from the sides of the carpet and arranged in a series corresponding to said series of light-transmissive housings with said housings being positioned in the holes of said carpet and being completely surrounded by said fibrous face, and power means electrically connected to said group of electrical conductors, so that when said light-emitting means are energized by said power means a visually discernible pathway is defined along the floor which can be followed by the occupants of the structure to the nearby emergency exit, and when the light-emitting means are not energized no pathway of lights is discernible and the light-emitting means are substantially hidden from view.

11. An apparatus according to claim 10, wherein said power means is a low voltage power supply.

12. An apparatus according to claim 10, including sequencing means for energizing saids light-emitting means in a desired sequence.

13. A lighting strip having light-emitting means for use in providing a visual pattern of lights along a surface when energized, and when the light-emitting means are not energized no pathway of lights is discernible and the light-emitting means are substantially hidden from view, whereby when the lighting strip is installed in a carpeted surface having relatively small holes extending therethrough, the light-emitting means are substantially completely surrounded by the fibrous surface of the carpet, said lighting strip comprising an elongate flexible ribbon of plastic sheet material, a group of laterally spaced-apart electrical conductors encased in and extending longitudinally of said ribbon of sheet material, a series of relative small light-transmissive housings connected to and arranged longitudinally in spaced relationship along a common outer surface of said ribbon of plastic sheet material, and a relatively small and singular light-emitting means within each of said housings and being electrically connected to predetermined ones of said group of electrical conductors.

14. A lighting strip according to claim 13 wherein said plastic housings have flanges extending laterally outwardly from lower regions thereof to provide an enlarged base on the housing for facilitating securing the housings along said ribbon of plastic sheet material in an upright attitude.

15. A lighting strip according to claim 13 wherein said electrical conductors are tape-like and are formed of metal, and said series of plasic housings overlie said tape-like metal conductors for enhancing the stability of the housings.

16. A lighting strip as claimed in claim 15, further comprising at least one auxiliary light-transmissive plastic housing separate from said longitudinally arranged series of light-transmissive plastic housings, said auxiliary light-transmissive plastic housing having an auxiliary light-emitting means positioned therein and means electrically connecting said auxiliary light-emitting means to a predetermined pair of tape-like metallic conductors in said group of tape-like metallic electrical conductors.

17. A lighting strip according to claim 15 wherein at least certain ones of said plastic housings are arranged in longitudinal alignment and overlie a common one of said tape-like electrical conductors, and wherein the light-emitting means within each of said aligned housings has a pair of conductors extending therefrom with one of the conducters of each pair being electrically connected to said common one of said tape-like electrical conductors and the other conductors of said pairs of conductors being electrically connected to selected ones of the remaining tape-like electrical conductors in said group.

18. A lighting strip according to claim 15 wherein at least certain ones of said plastic housings are arranged in longitudinal alignment and overlie a common one of said tape-like electrical conductors, and wherein the light-emitting means within each of said aligned housings has a pair of conductors extending therefrom with one of the conducters of each pair being electrically connected to said common one of said tape-like electrical conductors, other conductors of each pair being electrically connected to a tape-like conductor immediately adjacent said common one of said tape-like electrical conductors, and further ones of said pairs of conductors being electrically connected to a tape-like conductor more remote from said common one of tape-like conductors so that the light-emitting means may be sequentially actuated so as to impart a visual direction thereto.

19. A lighting strip having light-emitting means for use in providing a visual pattern of lights along a floor surface when energized, and when the light-emitting means are not energized no pathway of lights is discernible and the light-emitting means are substantially hidden from view, whereby when the lighting strip is installed in a carpeted surface having relatively small holes extending therethrough, the light-emitting means are substantially completely surrounded by the fibrous surface of the carpet, said lighting strip comprising an elongate flexible ribbon formed of relatively stiff plastic sheet material, the stiffness of the plastic sheet material forming said ribbon imparting such flexural rigidity to the ribbon both lengthwise and widthwise thereof as to provide a memory to urge the ribbon to lie linearly in a straight condition along a floor surface, a group of laterally spaced-apart tape-like metallic electrical conductors encased in and extending longitudinally of said ribbon of sheet material, a series of relatively small light-transmissive plastic housings connected to and arranged longitudinally in spaced relationship along a common outer surface of said ribbon of plastic sheet material, and a relatively small and singular light-emitting means within each of said housings and being electrically connected to predetermied ones of said group of tape-like metallic electrical conductors.

20. A lighting strip as claimed in claim 19, further comprising at least one auxiliary light-transmissive plastic housing separate from said longitudinally arranged series of light-transmissive plastic housings, said auxiliary light-transmissive plastic housing having an auxiliary light-emitting means positioned therein and means electrically connecting said auxiliary light-emitting means to a predetermined pair of tape-like metallic conductors in said group of tape-like metallic electrical conductors.

* * * * *